United States Patent [19]

Powell et al.

[11] Patent Number: 4,771,437
[45] Date of Patent: Sep. 13, 1988

[54] INTEGRATED LASER/FLIR RANGEFINDER

[75] Inventors: Richard Powell, Dallas; James A. McKay, Garland, both of Tex.

[73] Assignee: Texas Instruments Incorporated, Dallas, Tex.

[21] Appl. No.: 42,552

[22] Filed: Apr. 24, 1987

Related U.S. Application Data

[60] Continuation of Ser. No. 766,172, Aug. 16, 1985, abandoned, which is a division of Ser. No. 472,537, Mar. 7, 1983, abandoned.

[51] Int. Cl.$^4$ .............................................. H01S 3/097
[52] U.S. Cl. .................................... 372/85; 372/107
[58] Field of Search ........................... 372/85, 58, 107

[56] References Cited

U.S. PATENT DOCUMENTS 4,317,090  2/1982  Nagai et al. ........................ 372/99

*Primary Examiner*—William L. Sikes
*Assistant Examiner*—Robert E. Wise
*Attorney, Agent, or Firm*—Melvin Sharp; Richard K. Robinson; Rene' E. Grossman

[57] ABSTRACT

A laser transmitter is comprised of a power converter connected to a power conditioner for converting the preregulated dc power to high voltage dc required for laser discharge. A pulse forming network is connected to the power converter, for generating short, high voltage high current pulses. A laser cavity is connected to the PFN for generating laser pulse beams in response to the PFN output. The laser cavity includes a housing with two thermal-expansion-matched metal electrodes sandwiched between opposing preionization electrodes mounted in wells formed in the ceramic housing. The ends of the wells are ceramic to form dielectric between the cavity electrodes and the preionization electrodes for capacitively coupling the preionization electrodes for cavity chamber and producing coronas in the laser cavity which produce UV radiation in the cavity without arcing. The laser cavity has glass-frit-sealed metal end-caps, a solder sealed out-coupler assembly, a total reflector mirror and total reflector mirror adjustment mechanism.

6 Claims, 5 Drawing Sheets

INTEGRATED LASER/FLIR RANGEFINDER

This application is a continuation of application Ser. No. 766,172, filed 8/16/85, abandoned, which is a division of Ser. No. 472,537, filed 3/7/83, abandoned.

BACKGROUND OF THE INVENTION

This invention relates to a laser for a thermally integrated laser rangefinder and more particularly to a non-arching laser.

In the past a typical rangefinding system included a coherent radiation source, such as, for example, a Nd:YAG Laser, which produces a pulse of energy which is transmitted to the target, reflected, and then received at the point of transmission. The total travel time is the measure of range to the target. The rangefinder is typically pointed at the target using information from a thermal imaging sensor, such as a FLIR.

Prior art lasers having total reflector mirrors rigidly connected to the laser housing have no means for correcting alignment thereof with the out-coupling mirror for lasing, and preionizers which use cathode pins gapped from anodes have suffered from two problems. The first is that a bright arc discharge rather than a uniform or diffuse (corona) is produced; such arcs disassociate the gas causing laser inefficiency and failure. The second problem is that the cathode pins are eaten away by the arcing process and reduce substantially the lifetime of the laser.

SUMMARY OF THE INVENTION

Accordingly, it is an object of this invention to provide a laser for a cost effective integrated laser/FLIR rangefinder.

Another object of the invention is to provide a low cost laser having a substantially increased lifetime for meeting the laser requirements of an integrated laser/FLIR rangefinder.

Still another object of the invention is to provide a laser having an adjustable total reflecting mirror for lasing adjustment and non-arcing preionizers.

Briefly stated the invention comprises a laser suitable for a thermally integrated laser rangefinder which includes preionizers utilizing capacitance to develop coronas, and to provide a total reflector assembly system having an alignment adjustment mechanism for aligning the total reflecting mirror substantially parallel to the out-coupling mirror to permit lasing.

The above objects and other objects or features of the invention will become more readily understood in the following detailed description taken in conjunction with the drawings in which:

BRIEF DESCRIPTION OF THE DRAWINGS

FIG. 3a is a fragmented cross-sectional view of the laser cavity taken along line A—A of FIG. 11;

Figure 1:
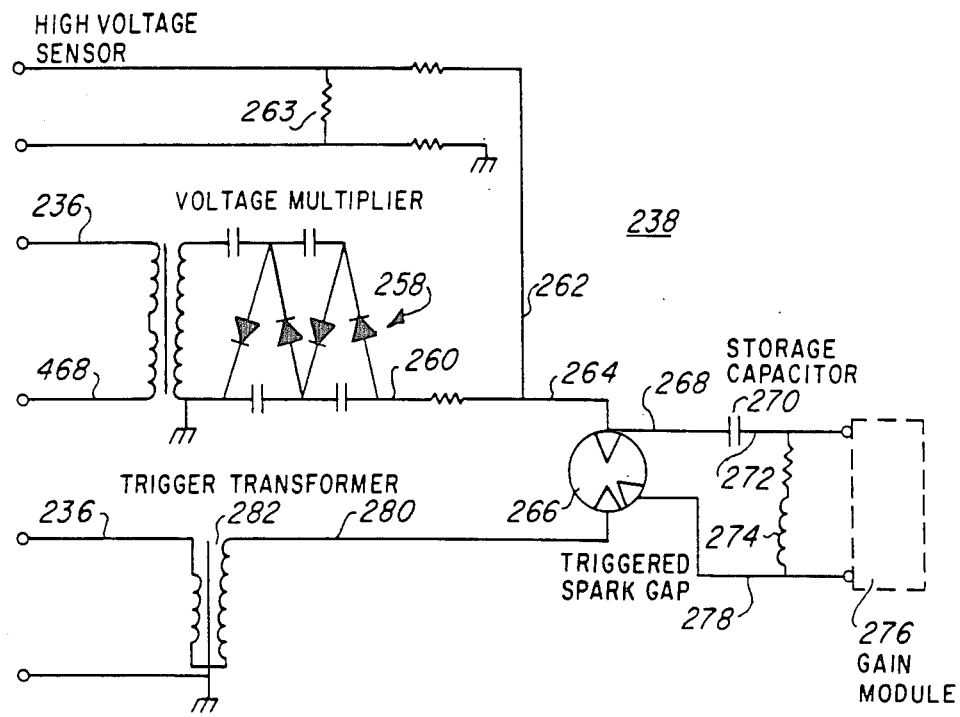
FIG. 1 is a schematic diagram of the laser pulse forming network (PFN)
Figure 2:
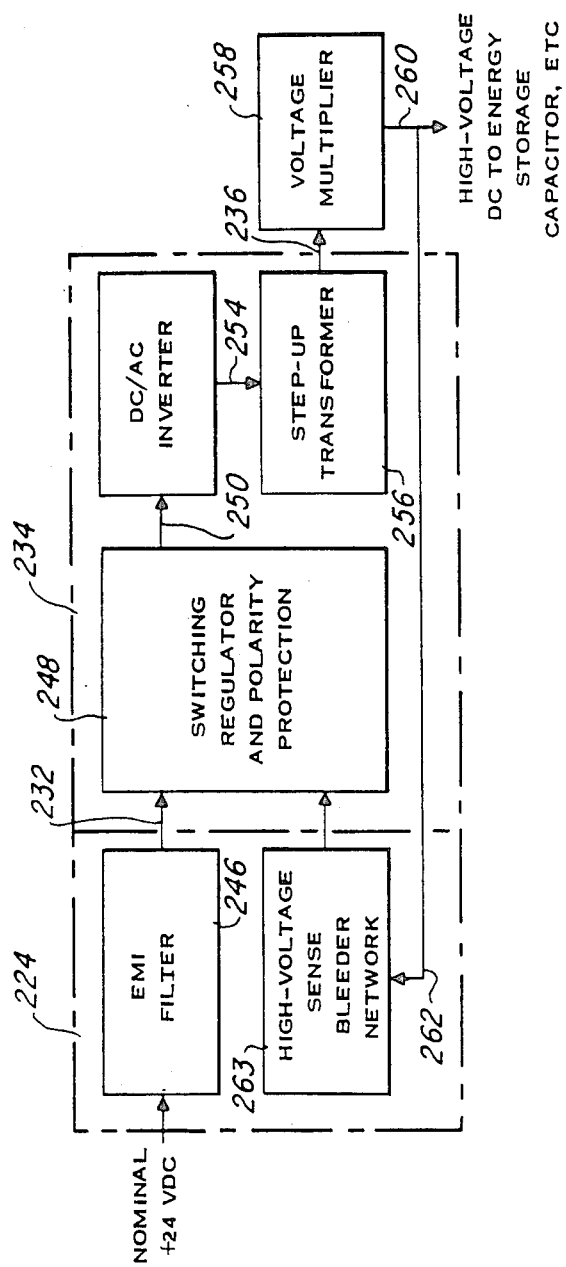
FIG. 2 is a functional block diagram of the power converter for the pulse forming network (PFN)
Figure 30:
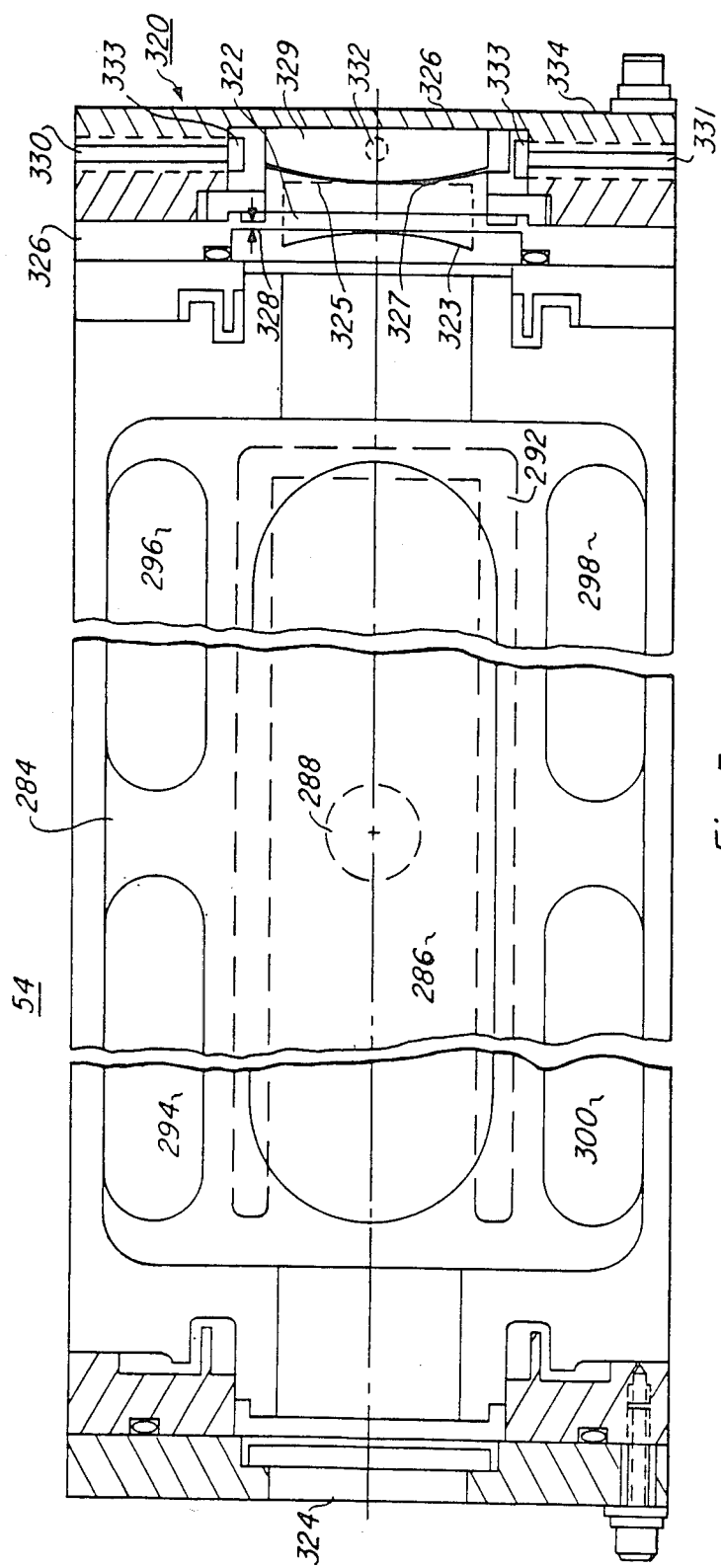

A laser pulse forming network (FIG. 1) is charged by a power converter 234 (FIG. 2). The voltage multiplier and surge protection network 258 which receives a chopped dc from the step up transformer 256 (FIG. 2) is connected by lead 260 (FIGS. 1 & 2) to the junction of leads 262 and 264 (FIG. 1). Lead 262 is connected to a high voltage sensor/bleeder network 263 which provides a high dc sense voltage for setting the dc regulator voltage. Lead 264 is connected to a first terminal of a spark generator 266. The first terminal of the spark generator is also connected by lead 268 to a first plate of a high voltage energy storage capacitor 270 having reliable operation at one pps continuous and five pps burst modes. The second plate of capacity 270 is connected by lead 272 to the junction of a shunt charging impedance network 274 and a gain module 276 of the laser cavity 242 (FIG. 6). A second terminal of the spark generator 266 is connected by lead 278 to the junction of a second end of the shunt charging impedance 274 and second terminal of the gain module 276. A third terminal of the spark generator 266 is connected by lead 280 to a high voltage trigger transformer 282.

Figure 3B:
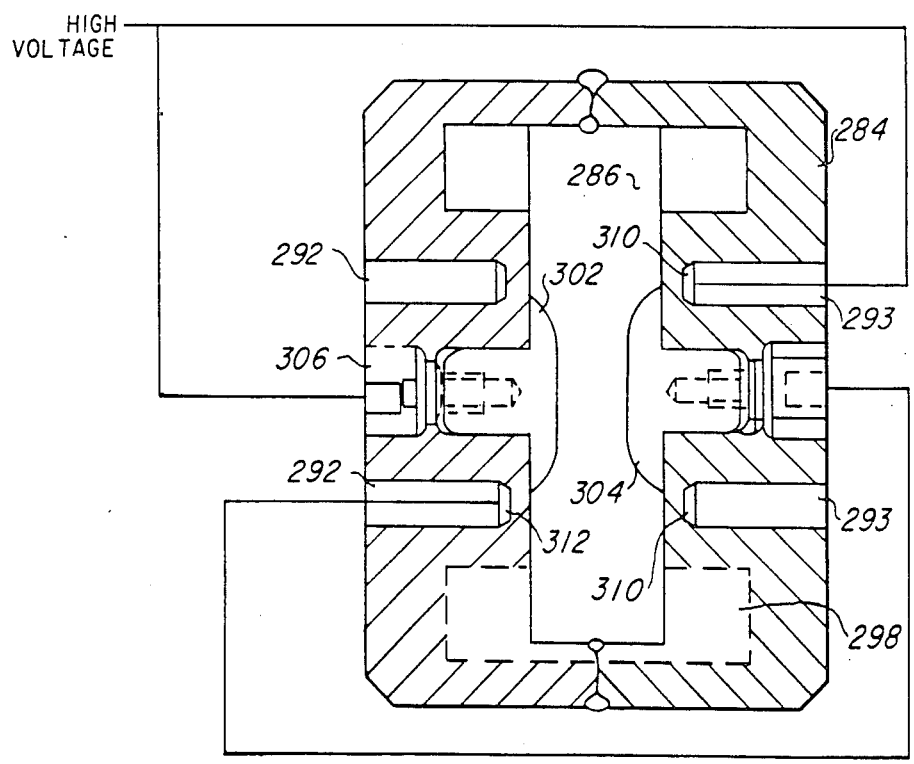
FIG. 3b is a cross-sectional view of the laser cavity taken along line B—B of FIG. 11.

Referring now to FIGS. 3a and 3b, laser 54 comprises a housing 284. The housing 284 is preferably formed of a ceramic manufactured by Corning Glass Manufacturer under the trademark MACOR. The housing forms an elongated cavity 286, a pair of opposing electrical channels 288 for electrode power coupling (only one of which is shown (FIG. 3a)), a pair of U-shaped preionizer slots 292 FIGS. 3a and 3b and 293 (FIG. 3b) and gas ballast cups 294, 296, 298, 300 (FIG. 3a). A pair of electrodes 302 and 304 (FIG. 3b) are mounted in the laser cavity 286. The electrode 304 is connected to ground and the electrode 302 to the high dc voltage. A pair of U-shaped preionizers 310 and 312 are mounted respectively, in preionizer slots 292 and 293. Preionizer 293 is connected to the high voltage source, preionizer 292 is connected to ground. The cavity 286 and gas ballast cups 294, 296, 298 and 300 (FIG. 3a) are in communication and filled with a gas mixture comprising, for example, carbon dioxide, nitrogen, and helium.

The U-shaped preionizers produce a corona discharge which produces UV radiation. The UV radiation photoionizes the gas in the main discharge region between the electrodes. This preionization of the main discharge region, when sufficient electron density is reached, reduces its impedance below that of the corona discharge and causes the remainder of the energy stored in capacitor 270 (FIG. 1) to be dumped into the main discharge region.

At a first end of cavity 286 (FIG. 3a) there is a total reflector assembly 320. The reflector assembly 320 comprises a mirror 322 having an inwardly deposed spherical surface 323 for reflecting the laser light through the cavity to an output coupling mirror 324. Mirror 322 has an outwardly deposed flat surface 325 which is fitted to a plate 326 which is preferably of brass. Brass plate 326 has a concave exterior surface 327 having a large (8") radius of curvature and a small (about 0.5") diameter, and a thin annular shaped membrane 328 integral with the part forming the concave exterior surface. An alignment block 329 has a convex surface corresponding to the concave surface 327 of the plate 326. The alignment block 329 has four equally spaced (90°) adjustment screws 330, 331, and 332 (the fourth is not shown) and bearing shims 333 for orthogonal movement of the convex surface. The alignment block 329 is held against the brass plate 326 by a retaining plate 334. In operation the four adjustment screws are selectively adjusted to move the alignment block 329 which forces the brass plate 326 to bend at the machined membrane 328 to tilt the reflecting mirror 322.

Figure 4:
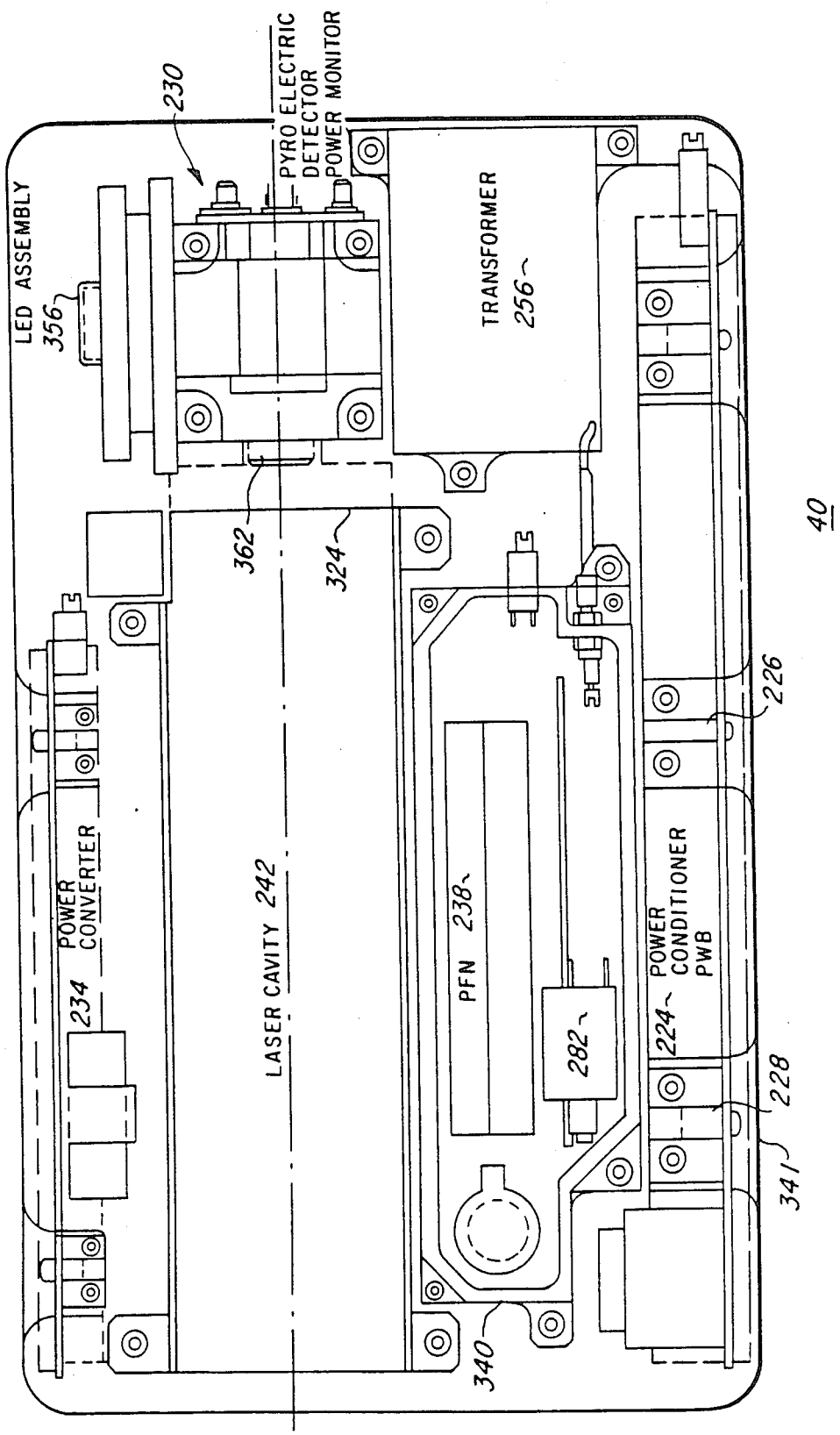
FIG. 4 is a plan view of the laser transmitter.

The laser transmitter system, as shown in FIG. 4, is arranged as follows. The power conditioner 224 is secured adjacent to a first side of a main housing 341. The step-up transformer 256 is attached to the main housing 341 adjacent to a first end of the pulse forming network (PFN) 238. The pulse forming network 238 is secured to a base plate 340 adjacent to the laser cavity 242. The base plate 340 is attached to the main housing 341. The laser cavity 242 is secured to the base plate 340 between the pulse forming network and power converter printed wiring board 234. The power converter board 234 is attached to the main housing 341 adjacent an edge opposed to the power conditioner printed wiring board 224. The laser optical bench assembly 230 is connected to the main housing 341 in optical alignment with output coupling mirror 324.

Figure 5:
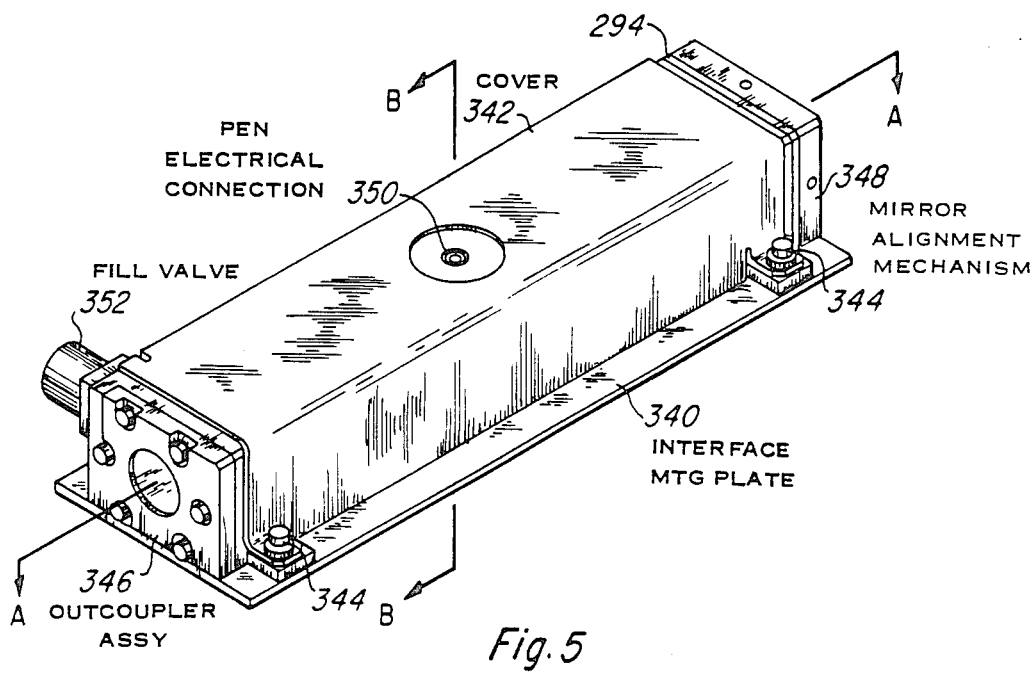
FIG. 5 is an isometric view of the laser transmitter.

A cover 342 (FIG. 5) is attached to base plate 340 by bolts 344 between the outcoupler assembly 346 and mirror alignment mechanism 348. The cover 32 includes an electrical connection 350 for the pulse forming network and a gas fill valve 352 for the laser cavity.

An optical bench 230 (FIG. 4) is provided for reducing the laser beam divergence to two milliradians, monitoring the laser power output for the range counter start pulse and malfunction condition and producing a visible (red) reticle that is aligned with the laser to be injected, for example, into the visible optics of a gunners primary sight. This reticle will provide an indication of the direction the laser beam is aimed for boresighting purposes.

Although preferred embodiments of the present invention have been described in detail, it is understood that various changes, substitutions and alterations can be made therein without departing from the scope of the invention as defined by the appended claims.

What is claimed is:

1. A laser transmitter comprising:
   a laser cavity having first and second ends;
   a total reflecting mirror operatively connected to the first end of the laser cavity;
   a mirror alignment means for adjusting the position of the total reflective mirror to a substantially parallel alignment position to an outcoupling mirror and includes; a support member having first and second ends with the first end having a recess formed therein for mechanically supporting the total reflecting mirror, the total reflective mirror having a flat surface on one side and a concave surface on a second side and the second end having an outwardly extending flange forming a thin annular shape membrane about the total reflecting mirror, an alignment block mounted in the recess of the first end and having a convex surface corresponding to the concave surface of the total reflective mirror, the convex surface of the alignment block being fitted to the flat surface of the total reflective mirror, and translating means for translating the alignment block within the recess of the first end whereby the support member operatively holds the flat surface to the convex surface and thus tilting the totally reflecting mirror is achieved by the positioning of the convex surface under the flat surface;
   an outcoupler assembly including the outcoupling mirror operatively connected to the second end of the laser cavity; and
   a means for energizing the laser cavity.

2. The laser transmitter according to claim 1 wherein the means for energizing the laser cavity includes a pulse forming network and the laser cavity comprises:
   (a) a housing having walls of dielectric material forming a cavity having first and second elongated sides and a pair of laser discharge electrodes mounted in said cavity;
   (b) a plurality of gas ballast cups in open communication with the laser cavity;
   (c) preionizer wells formed in the housing on opposing sides of the laser cavity and passages formed in the housing for the pair of laser discharge electrodes; and
   (d) preionization electrodes connected to the pulse forming network, the preionization electrodes mounted in the preionizer wells of the housing, said dielectric material separating the preionization electrodes from the laser discharge electrodes, such that the position of said preionizer electrodes, to said laser discharge electrodes and the separation by the dielectric coact to form capacitors in the laser cavity.

3. The laser transmitter according to claim 2 wherein the pulse forming network includes:
   a voltage multiplier;
   a surge-protection resistor network connected to the voltage multiplier;
   a high voltage spark gap means having first, second and third electrodes, the first electrode connected to the voltage multiplier;
   a storage capacitor connected to the first electrode;
   a shunt charging impedance having a first end connected to the storage capacitor and a second end connected to the second electrode; and
   a high voltage trigger transformer connected to the third electrode of the spark gap means.

4. The laser transmitter according to claim 2 further including a power converter means connected to the pulse forming network and the power converter means comprises:
   a switching regulator and polarity protection means;
   a dc/ac inverter means connected to the switching regulator and polarity protection means; and
   a step-up transformer for connecting the dc/ac inverter to the pulse forming network.

5. The laser transmitter according to claim 4 further including a power conditioner including an electromagnetic interference filter means connected to the power converter means for filtering of electromagnetic interference.

6. The laser transmitter according to claim 2 further including:
   a housing base member for supporting the housing, the pulse forming network, a first transformer adjacent to a preselected end of the pulse forming network, a power converter adjacent to the second side of the housing, a power conditioner adjacent to the pulse forming network, and a cover member attached in sealing engagement to the housing base member.

* * * * *